United States Patent

[11] 3,587,230

[72] Inventor Ross D. Schmidt
 Chisago City, Minn.
[21] Appl. No. 653,101
[22] Filed July 13, 1967
[45] Patented June 28, 1971
[73] Honeywell, Inc., Minneapolis, Minn.

[54] GAS TURBINE ENGINE CONTROL APPARATUS
 8 Claims, 4 Drawing Figs.
[52] U.S. Cl. .................................................. 60/39.28
[51] Int. Cl. .................................................... F02c 9/04
[50] Field of Search ........................................ 60/39.28

[56] References Cited
 UNITED STATES PATENTS
 3,302,398 2/1967 Taplin et al. .................. 60/39.28

Primary Examiner—Samuel Feinberg
Attorneys—Roger W. Jensen, Charles J. Ungemach and Ronald T. Reiling ABSTRACT: A closed loop fluidic stall prevention circuit for a turbojet engine control system comprising a temperature sensor, a speed sensor and a function generator. The function generator converts an engine speed signal from the speed sensor into a reference temperature signal. The reference temperature signal is combined with a turbine inlet temperature signal from the temperature sensor to provide an output which is used to control a fuel valve.

PATENTED JUN28 1971 3,587,230

INVENTOR.
ROSS D. SCHMIDT
BY Ronald T. Reiling
ATTORNEY

INVENTOR.
ROSS D. SCHMIDT
BY Ronald T. Reiling
ATTORNEY

GAS TURBINE ENGINE CONTROL APPARATUS

The invention herein described was made in the course of or under a contract, or subcontract thereunder, with the Department of the Air Force.

BACKGROUND OF THE INVENTION

This invention relates generally to control apparatus and more specifically to fluidic apparatus for controlling the operation of power systems including turbojet engines.

In the operation of a turbojet engine, it is normally advantageous for the fuel flow to be controlled in response to a selected engine speed or power output. In addition, if the selected speed is changed, the fuel flow should be controlled such that the actual engine speed is brought into agreement with the selected speed at the fastest rate allowable for the engine. However, at all times the fuel flow must also be limited to prevent excessive engine temperatures. Further, upon a call for acceleration, the fuel flow must be limited to prevent an unstable flow condition through the compressor known as compressor stall or surge. In accordance with the present state of the art, it has not been found feasible to directly sense impending compressor stall. However, it has been found that functions of various engine operating parameters can provide an indication of an incipient stall condition. In general, the functions of the operating parameters which can be used to indicate stall are quite complex. Further, the parameters which can be used in the least complex stall prevention techniques have been found to be the most difficult to sense. In any case, in order to obtain optimum engine performance, the sensors and circuits used in a stall prevention system must have very fast response times. Otherwise the system must be derated to insure that the transient value of any operating parameter does not exceed its allowable limit.

Various solutions to the problem of preventing stall in a turbojet engine have previously been proposed, all of which have undesirable features. For example, it has been proposed to sense the pressure differential across selected compressor blades in which case a pressure differential in excess of a predetermined limit will indicate impending compressor stall. It has also be proposed to sense impending separation of the flow across selected compressor blades as an indication of compressor stall. In each of these cases the measurement of the parameter is very difficult and there is only a small change in the parameter as compressor stall is approached. Further, implementation of these techniques requires that compressor blades be instrumented. The fact that these blades are very thin makes them difficult to instrument with sufficiently durable instrumentation.

Another parameter which has been proposed as a means for indicating impending compressor stall is the compressor discharge pressure. This technique uses the fact that for any given set of operating conditions, the compressor is not capable of proper operation with a back pressure in excess of a given limit. Therefore, as the compressor discharge pressure approaches this limit, the fuel flow to the engine is reduced. However, if stall is inadvertently encountered as may happen under certain schedules of engine acceleration, the compressor discharge pressure decreases, thus increasing the fuel flow to the engine. Accordingly, the unstable engine operation is aggravated rather than eliminated. It has also been proposed to use rate of change of compressor discharge pressure to indicate compressor stall. This technique is based on the fact that as compressor stall is approached, there is a rapid increase in the compressor discharge pressure. However, again, if compressor stall is inadvertently encountered, the rate of change of compressor discharge pressure may be such that the engine is not brought back into stable operation.

Combustion chamber temperature or turbine inlet temperature may be used to indicate impending compressor stall. This technique is based on the fact that for any given engine speed, there is a turbine inlet temperature above which stall is imminent. In general, the stall prevention systems which have been proposed for making use of this parameter have used thermocouples for sensing the temperature. However, thermocouples which are sufficiently massive or sufficiently well shielded to withstand the extremely high temperatures which are encountered within an engine have relatively slow response times. Therefore, prior art systems using this technique have been derated resulting in substantially less than optimum engine performance.

In order to eliminate the necessity of sensing the extremely high internal engine temperatures, it has also been proposed to use the turbine exhaust temperature for indicating impending compressor stall. However, the temperature differential across the turbine is a function of the energy extracted from the propulsion fluid by the turbine which is, in turn, a function of the load on the turbine and various other operating and environmental conditions. Turbine exhaust temperature, therefore, has not been found to be an accurate indication of impending compressor stall.

In the previously discussed techniques, the volumetric flow rate of fuel to the engine is the primary independent operating variable. Independent operating variable is defined to be an operating variable which can be directly controlled. Further, in accordance with the previously discussed techniques, as stall is approached, the flow rate of fuel to the engine is limited by a predetermined flow rate schedule. This schedule is set up so as to limit the volumetric flow rate of fuel to a value below which stall will not occur.

Systems of this type provide no compensation for variations in the heat content of the fuel or variations in the engine combustion efficiency. Thus, a fuel flow rate schedule for an engine using fuel of a certain heat content and operating at a certain efficiency may allow stall to occur or may not provide for maximum engine performance if fuel of a different heat content is used or if the engine efficiency changes as happens with engine age.

Further, systems of this type provide no compensation for the inherent heat storage capacity of the engine hardware. Thus, a certain fuel flow schedule may normally provide stall free engine operation, but may allow stall if the engine is rapidly and repeatedly accelerated and decelerated. In this case, at the end of an acceleration, the engine hardware is very hot and remains hot for a period of time even after the engine has returned to idle speed. If the engine is immediately accelerated again, heat is added to to propulsion fluid within the engine both from combustion of the fuel and from the engine hardware and stall may be encountered even though the fuel flow rate schedule is not exceeded.

In order to completely eliminate the danger of compressor stall in each of the previously discussed situations, the values of the fuel flow rate schedule must be less than the values permissible if these conditions did not exist. Thus, the engine performance in normal operation is reduced.

In addition to the noted disadvantages, the previously discussed techniques have generally been implemented with electrical and mechanical components. Consequently, they have been complex, subject to wear and sensitive to their environmental conditions. For these reasons, it is apparent that the prior art stall prevention systems are not generally satisfactory for use with modern turbojet engines.

SUMMARY OF THE INVENTION

The applicant's invention is a closed loop fluidic control system for a turbojet engine. The control system includes stall prevention means comprising a fluidic speed sensor. The speed sensor senses the engine speed and provides a fluid output signal indicative thereof to the stall controller. The stall controller generates a fluid signal indicative of an allowable reference temperature based on the engine speed signal. The temperature sensor senses a temperature within the engine and provides a fluid signal indicative thereof to the stall controller. The controller generates a compensated temperature signal based on the signal from the temperature sensor. The stall controller compares the allowable reference temperature signal with the compensated temperature signal and generates a resultant signal. The resultant signal is utilized to control certain independent engine operating variables such as the flow of fuel to the engine and/or the turbine inlet area so as to prevent compressor stall and surge. In addition, the control system provides signals to the control means to prevent the engine from operating above a maximum allowable speed or maximum allowable temperature. The control system also provides a selected speed signal to the control means. The control means controls the flow of fuel to the engine in response to all of these signals.

The applicant's invention overcomes the problems of the prior art systems by utilizing a temperature within the engine as the stall indicating parameter. The applicant's invention further overcomes the problems of the prior art systems by controlling independent engine operating variables in accordance with functions of an actual engine temperature rather than in accordance with predetermined schedules. Thus, the compressor blades are not required to be instrumented with delicate instrumentation. Also, there is a relatively large change in the engine temperature as compressor stall is approached. Further, engine temperature provides an unambiguous indication of compressor stall. In addition, engine temperature provides inherent compensation for variations in engine efficiency and heat content of the fuel. Engine temperature also provides inherent heat storage capacity compensation. In accordance with the teachings of this invention, stall prevention is further accomplished with a minimum number of simple rugged fluidic components. In addition, the circuit of the present invention has very fast response and is thus able to prevent stall while allowing optimum engine performance.

DESCRIPTION OF THE PREFERRED EMBODIMENT

Figure 1:
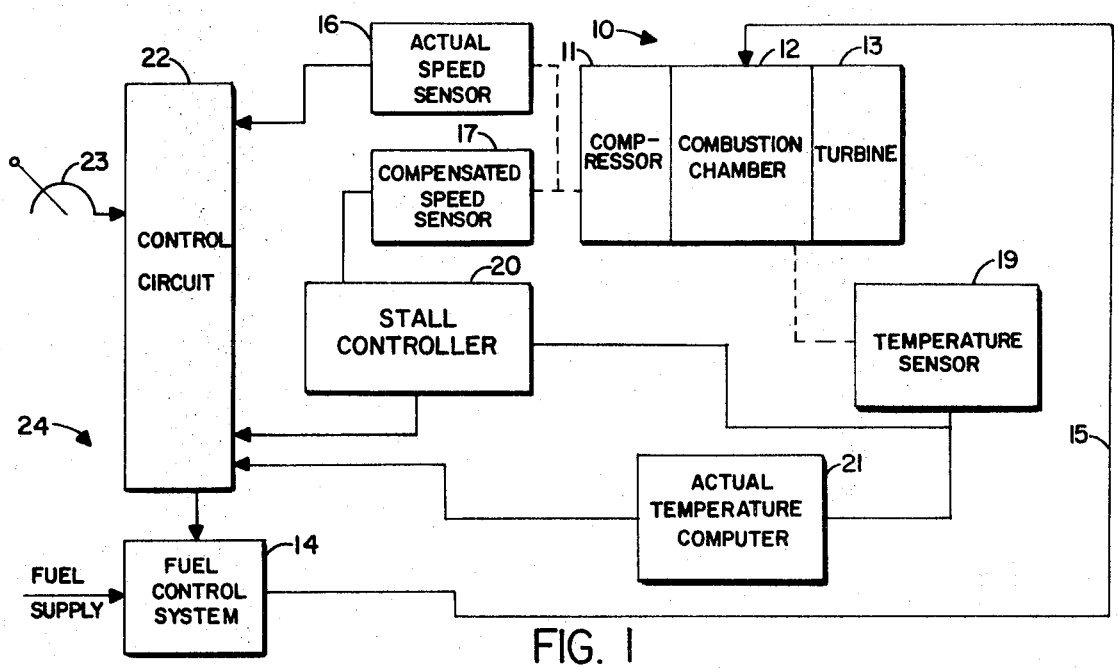
FIG. 1 is a functional block diagram of a fluidic turbojet engine control system including speed, temperature and stall control functions.

The applicant's control system as disclosed herein is applied to a turbojet engine, and more particularly to the control of fuel delivered thereto in response to a command signal and various engine operating parameters. For the purposes of this specification, turbojet engine is defined to include any type of internal combustion engine wherein combustion gases are used to drive at least one turbine therewithin. Turbojet engines specifically include jet engines wherein combustion gases are first routed through a turbine which drives a compressor within the engine and are then ducted through a thrust producing nozzle. Turbojet engines also include gas turbine engines wherein combustion gases are first routed through a turbine which drives a compressor within the engine and are then ducted into a separate power turbine which provides the engine with a mechanical output.

It should be understood that some of the basic computing and sensing components and subsystems of the present invention will have broader application than shown herein. The present description should therefore be considered only as illustrative of these components and subsystems.

The applicant's control system for a turbojet engine controls the fuel flow to the engine in response to a selected engine speed or power output. In addition, if the selected speed is changed, the control system brings the actual engine speed into agreement with the selected speed at the fastest rate allowable for the engine. At all times the control system functions to prevent excessive engine temperatures and to prevent excessive engine speeds. Upon acceleration of the engine, the control system prevents an unstable flow condition through the compressor known as compressor stall or surge.

The applicant's control system comprises means for (1) feeding in the selected speed of the engine; (2) monitoring the speed of the engine; (3) monitoring the temperature of the engine; (4) generating stall functions for the engine; and (5) controlling one or more independent operating variables of the engine in response to 1 through 4 above. The applicant's control system utilizes unique means for sensing incipient stall and preventing the occurrence of stall while controlling the operation of the engine to allow optimum efficiency. This means includes speed sensing means, temperature sensing means and stall controller means. The speed sensing means and temperature sensing means provide signals which are fed to the stall controller means which generates a third signal in response thereto. The signal from the stall controller means is fed to the control means to control one or more independent operating variables of the engine so as to prevent stall from occurring. The signal from the stall controller means is capable of overriding an input from a speed selector. In addition, means are included in the control system for providing signals to the control means to prevent the engine from operating above a maximum allowable speed or maximum allowable temperature.

Referring now in more detail to the means for sensing incipient stall and preventing it from occurring, the applicant has discovered that a useful function for indicating incipient compressor stall is the compensated turbine inlet temperature versus the compensated engine speed.

The compensated turbine inlet temperature is defined to be $\sqrt{T_4/\theta}$ where $T_4$ is the actual temperature at the inlet to the turbine in degrees Rankine and $\theta$ is the actual temperature of the air entering the compressor in degrees Rankine divided by 520. The compensated engine speed is defined to be $N\sqrt{\theta}$ where N is the actual rotational velocity of the compressor in r.p.m. The system by which these parameters can be used to prevent stall can be understood by reference to the block diagram of FIG. 1 in which reference numeral 10 generally refers to a turbojet engine having a compressor 11, a combustion chamber 12 and a turbine 13. Fuel is injected into combustion chamber 12 from a fuel supply (not shown) by means of fuel control system 14 and fuel supply conduit 15.

Speed sensing means 16, 17 are provided. The actual engine speed is sensed by means of a fluidic analog speed sensor 16 which is in communication with the compressor and/or turbine shaft. The compensated engine speed is sensed by means of a fluidic digital speed sensor 17 also in communication with the compressor and/or turbine shaft. Compensated speed sensor 17 provides a fluid output signal indicative of the actual engine speed divided by the square root of $\theta(N/\sqrt{\theta})$, as hereinbefore discussed. The fluid output signal of speed sensor 17 is supplied to stall controller 20. Stall controller 20 generates a fluid reference temperature signal which is a function of the compensated engine speed. Temperature sensing means 19, 21 are provided. The engine temperature at the turbine inlet is sensed by means of a temperature sensor 19 which provides a fluid output signal indicative thereof to stall controller 20. Stall controller 20 generates a fluidic compensated temperature signal based on the signal from the temperature sensor. This compensated temperature signal is indicative of the square root of the turbine inlet temperature divided by the square root of $\theta(\sqrt{T_4/\theta})$, as hereinbefore discussed.

The stall controller compares the reference temperature signal and the compensated temperature signal and generates a resultant signal. The resultant signal is conveyed to a control circuit 22 of control means 24. Control means 24 also includes fuel control system 14. Control means 24 may also include controls (not shown) for other independent engine operating variables such as the turbine inlet area.

The output signal of temperature sensor 19 is also supplied to an actual temperature computer 21. Actual temperature computer 21 produces a fluid output signal which is a function of the actual temperature at the turbine inlet. The fluid output signals from actual speed sensor 16 and actual temperature computer 21 are also supplied to control circuit 22 of control means 24. Control circuit 22 is also supplied with a fluid input signal from a speed selector 23. Control circuit 22 produces fluid control signals for fuel control systems 14 and/or control systems (not shown) for other independent engine operating variables. The fluid control signals from control circuit 22 are dependent on the setting of speed selector 23, the output of actual speed sensor 16, the output of stall controller 20 and the output of actual temperature computer 21. Thus control means 24 varies the flow of fuel to engine 10 and/or other independent engine operating variables in response to signals from the speed sensing means, the temperature sensing means and the stall controller means.

In operation, if the selected speed is greater than the actual engine speed, control circuit 22 functions to provide a signal to fuel control system 14 such that the fuel flow to engine 10 is increased. However, the flow of fuel to engine 10 is also dependent on the signals from speed sensor 16, controller 20 and temperature computer 21. If impending stall is indicated or the actual engine temperature reaches a predetermined maximum allowable limit, control means 24 functions to reduce the fuel flow to engine 10 to the point that stall is no longer impending and the maximum allowable limit for the engine temperature is not exceeded.

Figure 2:
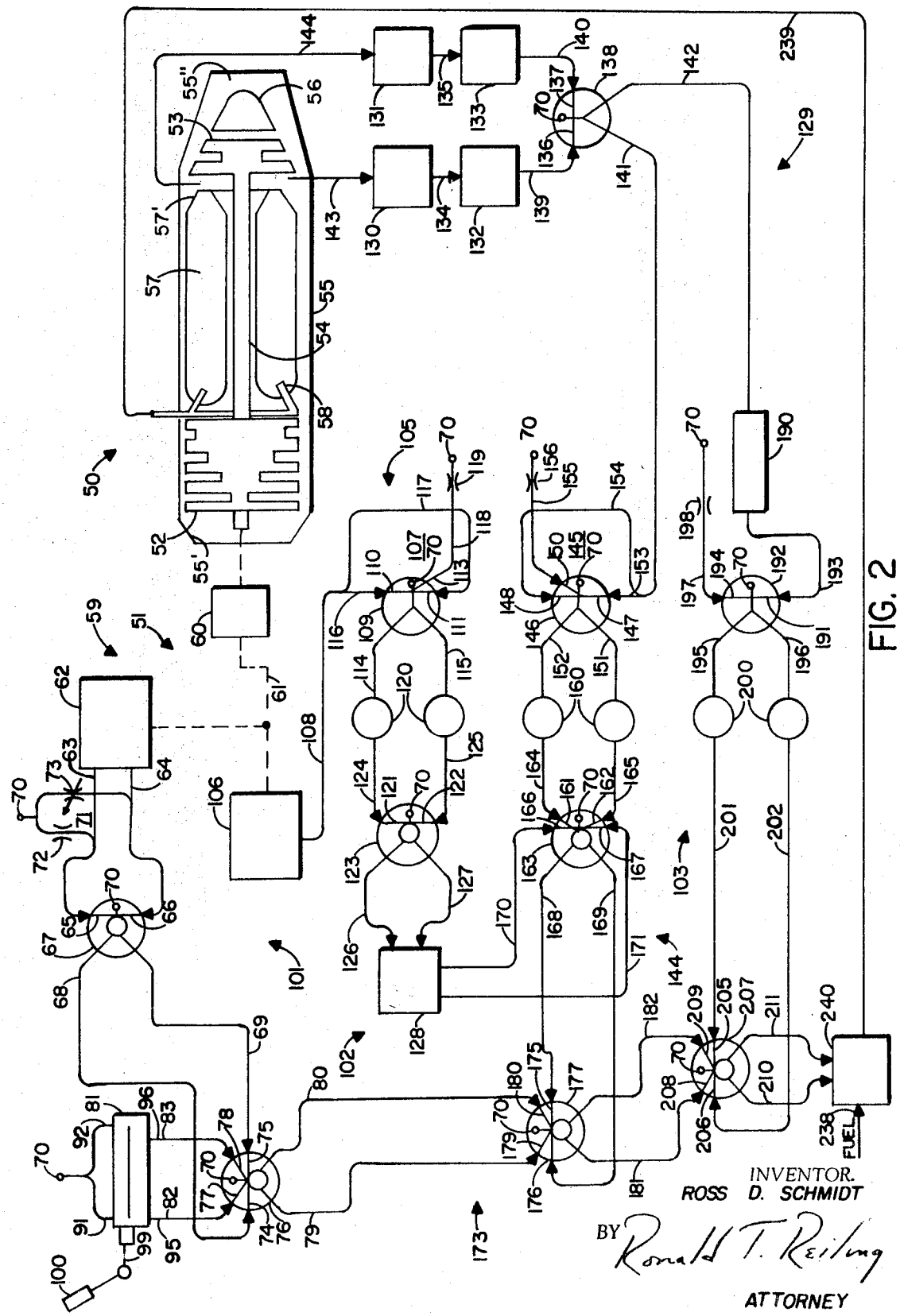
FIG. 2 is a schematic representation of a fluidic turbojet engine control system incorporating the teachings of the present invention.

Referring now to FIG. 2 and the control system shown therein, reference numeral 50 generally refers to a turbojet engine. Reference numeral 51 generally refers to a fluidic control system for turbojet engine 50. Turbojet engine 50 comprises a compressor 52 and a turbine 53 carried on a common shaft 54 in suitable bearings (not shown) and enclosed in a suitable casing 55. An inlet 55' is provided in casing 55 so as to allow the compressor to draw air to supply a combustion chamber 57 surrounding shaft 54 and located between compressor 52 and turbine 53. Fuel is supplied to a plurality of injectors 58 from a fuel supply (not shown) by means of fuel supply conduits 238 and 239 and a fuel metering valve 240. Fuel from injectors 58 is mixed with compressed air from compressor 52 in combustion chamber 57 and burned. Additional energy is added to the compressed air in combustion chamber 57 as a result of its increase in temperature and the addition of combustion products. The high temperature combustion gases then flow through nozzles 57' to turbine 53 which extracts energy therefrom at a rate sufficient to drive compressor 52. Thereafter the combustion gases are discharged past a fairing 56 and through an outlet duct 55'' in casing 55.

Engine 50 is shown in FIG. 2 as being a jet engine wherein the energy remaining in the combustion gases after leaving the turbine is converted into thrust. It should, however, be understood that the control system of the present invention is equally as applicable to a gas turbine engine wherein the exhaust gases are ducted through a separate power turbine. The power turbine then converts the remaining energy of the combustion gases into mechanical energy which is transmitted by means of a rotating shaft. Although the present invention applies to either type of engine, it will be described in detail in this specification in connection with a jet engine.

Shaft 54 is connected to a suitable gear reducer 60 to operate an accessory drive shaft 61. Thus, the speed of the shaft 61 is a measure of the speed of the engine. Speed sensing means 59 is provided and includes a fluidic analog speed sensor 62. Sensor 62 is driven by shaft 61 and produces an analog engine speed output signal in the form of a fluid pressure differential in conduits 63 and 64. Sensor 62 may be of any suitable type. One such device is disclosed in the copending application of Donald J. Erickson, Ser. No. 617,734, filed Dec. 12, 1966 as a continuation-in-part of application Ser. No. 352,269, filed March 16, 1964, now U.S. Pat. No. 3,363,453, and assigned to the assignee of the present application. Conduits 63 and 64 connect speed sensor 62 to control ports 65 and 66 respectively of a proportional fluid amplifier 67. Proportional fluid amplifier 67 also includes a pair of outlet passages 68 and 69 and a power nozzle continuously supplied with fluid from a fluid source 70 which is common to many elements in this system. Bias arrangement 71 is also supplied with fluid from fluid source 70 and supplies fluid to control port 65 through a restriction 72 and to control port 66 through a variable restriction 73. It should be understood that even though a single fluid amplifier such as 67 is shown at various points in FIG. 2, a cascade of such amplifiers may equally as well be used where this appears to be desirable. The output of the amplifier 67 appears as a fluid pressure differential between outlet passages 68 and 69. The fluid pressure in outlet passage 68 may be either more or less than the fluid pressure in outlet passage 69 depending on the setting of bias arrangement 71.

Engine 50 always runs in the same direction, therefore, the pressure differential output signal of speed sensor 62 always has the same sense. It has a value of zero when shaft 54 is motionless and a maximum value when shaft 54 reaches the maximum allowable speed. The function of bias arrangement 71 is to modify the fluid signals reaching control ports 65 and 66 such that they are equal for some predetermined speed of shaft 54 between zero and its maximum value. The signal at control port 65 thereby exceeds that at control port 66 for a shaft speed greater than the predetermined value, and the pressure at control port 66 exceeds that at control port 65 for a shaft speed less than the predetermined value. Thus, the operation of amplifier 67 throughout its full linear range is provided.

The fluid pressure differential output signal of amplifier 67 is supplied to oppositely acting control ports 74 and 75 of a fluid summing amplifier 76. Amplifier 76 also has a power nozzle which is continuously supplied with fluid from fluid source 70. In addition, amplifier 76 includes an additional pair of oppositely acting control ports 77 and 78 and a pair of outlet passages 79 and 80. Control ports 77 and 78 are supplied with a fluid pressure differential signal from a fluid potentiometer 81 by means of conduits 82 and 83 respectively. A selector 100 and potentiometer 81 are collectively referred to as speed selection means.

Figure 3:
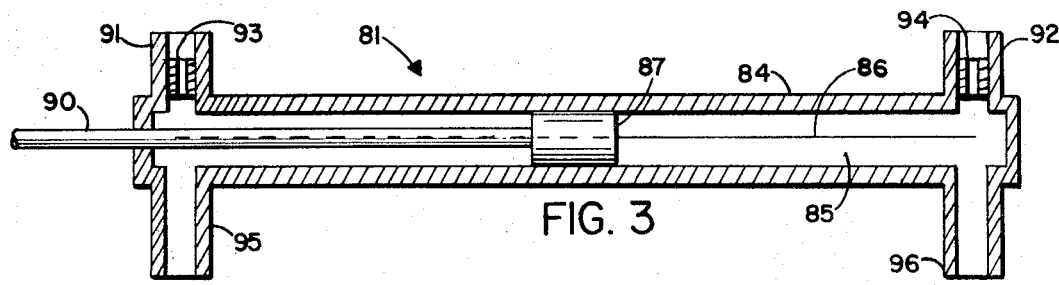
FIG. 3 is a sectional view of a fluid potentiometer suitable for use in the control system of FIG. 2.

Reference is now made to FIG. 3 which more clearly shows fluid potentiometer 81. Fluid potentiometer 81 comprises a housing 84 enclosing an elongated cylindrical chamber 85. Housing 84 includes a narrow slit 86 passing through one wall and extending the full length of chamber 85. A piston 87 is slideable in the chamber 85 by means of a control rod 90 which passes in slideably sealed relation through one end of housing 84. The other end of housing 84 is sealed. A pair of taps 91 and 92 at opposite ends of chamber 85 are adapted to be supplied with fluid from a common source and contain restrictions 93 and 94 respectively. Chamber 85 is also provided at opposite ends thereof with a pair of outlet ports 95 and 96. In operation, if restrictions 93 and 94 are equal and piston 87 is located at the center of chamber 85, there is no pressure differential between outlet ports 95 and 96. As piston 87 is moved closer to one end of chamber 85, the pressure at the outlet port at the end increases. Correspondingly, the pressure in the outlet port at the other end decreases. Thus by displacing piston rod 90 linearly with respect to housing 84, a signal can be obtained in the form of a pressure differential between outlet ports 95 and 96.

Referring again to FIG. 2, taps 91 and 92 of fluid potentiometer 81 are supplied with fluid from fluid source 70. Outlet ports 95 and 96 are connected to control ports 77 and 78 of amplifier 76 by means of conduits 82 and 83 respectively. Piston rod 90 is actuated through a suitable mechanical connection 99 by means of manual speed selector 100. Thus, fluid potentiometer 81 serves to provide amplifier 76 with a fluid pressure differential signal indicative of the manually selected engine speed.

Elements 62 through 100 comprise a speed control circuit 101. In addition to speed circuit 101, the control system of the present invention also includes stall prevention circuit 102 and a temperature limiting circuit 103. Stall prevention circuit 102 includes speed sensing means 59, temperature sensing means 129 and stall controller means 144 which will be described in detail hereinafter. Speed sensing means 59 also includes a digital compensated speed sensor 105 of the type disclosed in the copending application of Jerome L. Johnson, Ser. No. 623,663 filed March 16, 1967, now Pat. No. 3,502,094, and assigned to the assignee of the present application. According to the application Ser. No. 623,663, the speed sensor includes a disc interrupter 106, shown in FIG. 2 at 106 having a mutually aligned fluid emitter and fluid receiver positioned on opposite sides of an apertured disc which is adapted to rotate therebetween and which is driven by means of shaft 61. The output of disc interrupter 106 is a train of fluid pressure pulses whose repetition rate is proportional to the speed of shaft 54.

The output of disc interrupter 106 is supplied to a temperature compensation circuit 107 by means of conduit 108. Temperature compensation circuit 107 includes a bistable fluid amplifier 109 having a power nozzle continuously supplied with fluid from fluid source 70, a pair of opposing control ports 110 and 111, an additional control port 113 and a pair of outlet passages 114 and 115.

Conduit 108 is connected to control ports 110 and 111 by means of short conduit 116 and longer conduit 117 respectively. Conduit 117 is exposed to the air entering compressor 52. The exact location of conduit 117 is optional. The only operational requirement is that it be located so as to sense the compressor inlet air temperature. Thus the temperature of the fluid within conduit 117 is essentially the same as the temperature of the air entering compressor 52. A bias pressure is supplied to control port 113 of amplifier 109 from fluid source 70 by means of conduit 118 and restriction 119. Amplifier 109 is thus biased such that the output thereof is normally from outlet passage 114. In operation, a fluid pressure pulse from disc interrupter 106 will first enter control port 110 of amplifier 109 and override the bias signal in control port 113, thus switching the output of amplifier 109 to outlet passage 115. At some later time, dependent on the temperature of the air to which conduit 117 is exposed, the same fluid pressure pulse will enter control port 111 thus switching the output of amplifier 109 back to outlet passage 114. It is apparent that when shaft 54 is not rotating, amplifier 109 will have no output from outlet passage 115 and as the speed of shaft 54 increases, the output of amplifier 109 will be from outlet passage 115 an increasing percentage of the time. Further, a the compressor inlet temperature increases, the pulse duration of the pulses from outlet passage 115 decreases due to the fact that the acoustic velocity within conduit 117 increases with increases in temperature therein.

Outlet passages 114 and 115 of amplifier 109 are connected to capacitance tanks 120 which serve to integrate the pressure pulses transmitted thereinto. The output of capacitance tanks 120 is an analog fluid pressure differential signal which is directly proportional to the speed of shaft 54 and inversely proportional to the square root of $\theta$. The outputs of capacitance tanks 120 are connected to control ports 121 and 122 of a proportional fluid amplifier 123 by means of conduits 124 and 125 respectively. Amplifier 123 also includes a power nozzle continuously supplied with fluid from fluid source 70 and a pair of outlet passages 126 and 127. Outlet passages 126 and 127 are connected to a function generator 128 of stall controller means 144.

Function generator 128 accepts a fluid analog compensated speed signal from temperature compensation circuit 107 and generates a fluid analog reference temperature signal indicative of the compensated engine temperature below which compressor stall will not occur. Function generator 128 may be of any suitable type. One such device is disclosed in the copending application of Edward G. Zoerb, Ser. No. 621,376, filed Jan. 12, 1967 as a continuation-in-part of application Ser. No. 361,055, filed Apr. 20, 1964, now U.S. Pat. No. 3,451,413, and assigned to the assignee of the present application.

The engine temperature at the turbine inlet is sensed by temperature sensing means 129 including fluidic temperature sensors 130 and 131 which are supplied with combustion gases from the turbine inlet by means of conduits 143 and 144 respectively. Although temperature sensors 130 and 131 are shown as being external to engine 50, they may equally as well be located internally in the engine in which case the conduits 143 and 144 may be eliminated. Temperature sensors 130 and 131 are of the fluid oscillator type and produce an oscillating output whose frequency is indicative of the temperature of the fluid therein. One such device is disclosed in the copending application of Edward G. Zoerb, Ser. No. 469,972, filed June 30, 1965 and assigned to the assignee of the present application. The geometry of temperature sensor 130 is slightly different than the geometry of temperature sensor 131 such that for any given engine temperature, the frequency of oscillation of the output signal from temperature sensor 130 is slightly different from that of temperature sensor 131.

The output signals of temperature sensors 130 and 131 are supplied to fluid couplers 132 and 133 by means of conduits 134 and 135 respectively. Fluid couplers 132 and 133 function to separate oscillating signals containing temperature information from the hot combustion gases as discussed in application Ser. No. 469,972. The combustion gases are thereafter vented from the system. The oscillation fluid temperature signals from coupling elements 132 and 133 are supplied to control ports 136 and 137 of a bistable fluid amplifier 138 by means of conduits 139 and 140 respectively. Amplifier 138 138 also includes a power nozzle which is continuously supplied with fluid from fluid source 70 and a pair of outlet passages 141 and 142. The output signals of amplifier 138 in both outlet passages 141 and 142 are square wave pulse trains, the repetition rates of which are the difference in frequency of the output signals from temperature sensors 130 and 131. The repetition rate of the output signals from outlet passages 141 and 142 is thereby indicative of the turbine inlet temperature of engine 50. Temperature sensing means 129 includes elements 130 through 144 as well as the temperature limiting circuit hereinafter described.

Outlet passage 141 is connected to stall controller means 144. More specifically, passage 141 is connected to a temperature compensation circuit 145 which includes a bistable fluid amplifier 146 having a pair of opposing control ports 147 and 148, an additional control port 150, a power nozzle continuously supplied with fluid from fluid source 70 and a pair of outlet passages 151 and 152. The fluid signal from outlet passage 141 of amplifier 138 is supplied to control ports 147 and 148 of amplifier 146 by means of a short conduit 153 and a longer conduit 154. Conduit 154 is exposed to the air entering compressor 52 thereby causing the fluid therein to have essentially the same temperature as the air entering the compressor. As in the case of conduit 117, the exact location of conduit 154 is optional. Control port 150 is supplied with a bias pressure from fluid source 70 by means of conduit 155 and restriction 156 thereby causing the output of the amplifier 146 to normally be from outlet passage 151. In operation, a fluid pressure pulse from outlet passage 141 will enter control port 147 first in time and override the bias signal in control port 150, thereby switching the output of amplifier 146 to outlet passage 152. At some later time, dependent on the temperature of the air to which conduit 154 is exposed, the same pressure pulse will enter control port 148, thereby causing the output of amplifier 146 to be switched back to outlet passage 151. The operation of compensation circuit 145 is similar to the operation of compensation circuit 107 and need not be further discussed. Outlet passages 151 and 152 of amplifier 146 are connected to capacitance tanks 160 which serve to integrate the pressure pulses transmitted thereinto and produce an analog pressure output signal. The magnitude of the pressure difference between the output signals of capacitance tanks 160 is directly proportional to the square root of the turbine inlet temperature and inversely proportional to the square root of $\theta$ and is identified as the compensated turbine inlet temperature.

The pressure differential output signal from capacitance tanks 160 is supplied to a first pair of opposing control ports 161 and 162 of a fluid summing amplifier 163 by means of conduits 164 and 165 respectively. Amplifier 163 also includes a second pair of opposing control ports 166 and 167, a power nozzle continuously supplied with fluid from fluid source 70 and a pair of outlet passages 168 and 169. Control ports 166 and 167 are connected to function generator 128 by means of conduits 170 and 171 respectively so as to receive the fluid temperature reference signal therefrom. Amplifier 163 functions to sum the compensated turbine inlet temperature signal with the reference temperature signal and provide an output which is indicative in sense and magnitude of the difference between the two input signals. Stall controller means 144 includes elements 128 and 145 through 171 in this particular embodiment. Elements 106 through 171 generally comprise the complete stall prevention circuit 102 in FIG. 2.

Outlet passages 168 and 169 of amplifier 163 are connected to control means 173. Control means 173 includes a summing amplifier 177. Passages 168 and 169 are connected to control ports 175 and 176 of amplifier 177. Amplifier 177 also includes an additional pair of opposing control ports 179 and 180 which are connected to outlet passages 79 and 80 respectively of summing amplifier 76, a power nozzle continuously supplied with fluid from fluid source 70 and a pair of outlet passages 181 and 182. Amplifier 177 functions to accept input signals from speed control circuit 101 and stall prevention circuit 102 and provide a fluid output signal which is indicative in sense and magnitude of the difference between the two input signals.

The square wave pulse train from outlet passage 142 of amplifier 138 is supplied to a resonant chamber 190. Resonant chamber 190 functions to amplify fluid signals having repetition rates near its resonant frequency and attenuate all other fluid signals. Resonant chamber 190 is sized to provide a large output signal at the frequency which is indicative of the maximum allowable operating temperature of engine 50. The output of resonant chamber 190 is supplied to control port 191 of a bistable fluid amplifier 192 by means of conduit 193. Amplifier 192 also includes an opposing control port 194, a power nozzle continuously supplied with fluid from fluid source 70 and a pair of outlet passages 195 and 196. A bias pressure is supplied to control port 194 from fluid source 70 by means of conduit 197 and restriction 198 such that the output of amplifier 192 is normally from outlet passage 196. However, as the repetition rate of the input signal to resonant chamber 190 approaches the resonant frequency thereof, the magnitude of the pulses supplied to control port 191 increases thus increasing the amount of time that the output of amplifier 192 is from outlet passage 195. Outlet passages 195 and 196 are connected to capacitance tanks 200 which serve to integrate the fluid pulse transmitted thereinto and provide a pressure in conduit 201 which rapidly increases with respect to the pressure in conduit 202 as the temperature of engine 50 approaches it maximum allowable limit. Elements 190 through 202 comprise temperature limiting circuit 103 which is included in temperature sensing means 129.

Figure 4:
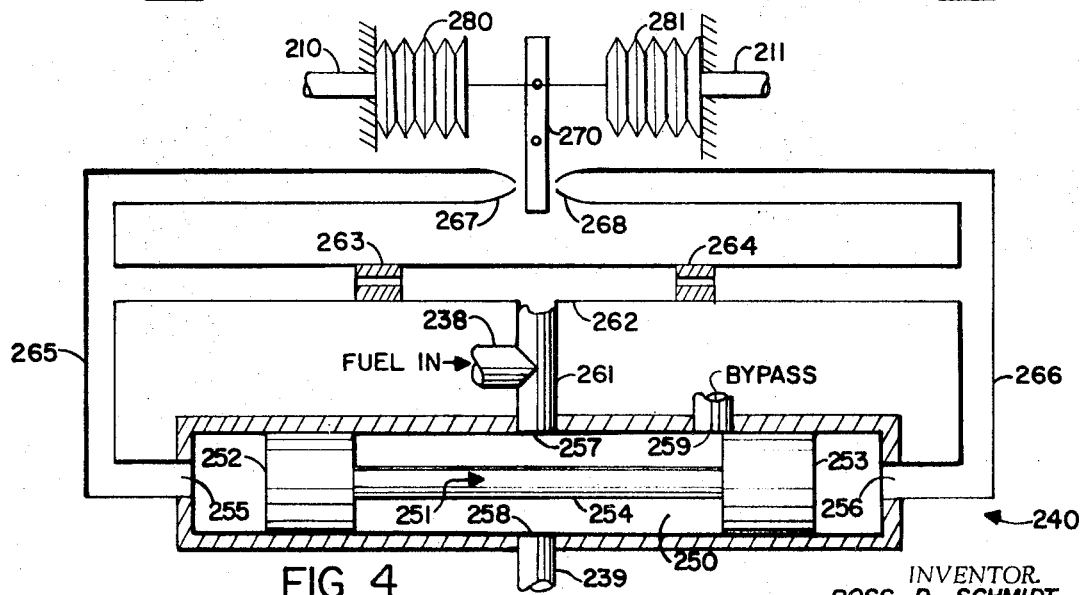
FIG. 4 is a schematic representation of a fuel valve suitable for use in the control system of FIG. 2.

Conduits 201 and 202 are connected to a pair of opposing control ports 205 and 206 respectively of a fluid summing amplifier speed; of control means 173. Amplifier 207 also includes an additional pair of opposing control ports 208 and 209 which are connected to outlet passages 181 and 182 respectively of amplifier 177, a power nozzle which is continuously supplied with fluid from fluid source 70 and a pair of outlet passages 210 and 211. Amplifier 207 functions to sum the fluid signal from amplifier 177 and the fluid signal from temperature limiting circuit 103 and provide an output which is indicative in sense and magnitude of the difference between the two input signals. Control means 173 also includes a fuel valve 240. As hereinbefore noted, control means such as 173 may also include means for controlling other independent engine operating variables such as turbine inlet area. A given turbojet engine control system may use any one or any combination of these independent engine operating variables. Only the details of a fuel control system are shown to avoid confusion in showing the applicant's present invention. Outlet passages 210 and 211 of amplifier 207 are connected to pneumatically controlled fuel metering valve 240 which can be more easily understood by referring to FIG. 4.

Valve 240 comprises a chamber 250 containing a spool valve 251 comprising a pair of pistons 252 and 253 connected by an intermediate connecting rod 254. Chamber 250 has a pair of end ports 255 and 256, a pair of centrally located ports 257 and 258 and an additional port 259 which may be opened or closed by piston 253 as spool valve 251 moves to the right or left. Fuel is supplied by means of fuel supply conduit 238 to a conduit 261 which is connected to port 257 and to conduit 262 between a pair of restrictions 263 and 264 contained therein. Conduit 262 is connected at opposite ends thereof to conduits 265 and 266 respectively. Conduit 265 terminates in port 255 at one end and in a nozzle 267 at the other end. Conduit 266 terminates in port 256 at one end and in a nozzle 268 at the other end. Nozzles 267 and 268 are mutually aligned and each is oriented toward the other, but separated therefrom. A flapper 270 is pivotally mounted for movement between nozzles 267 and 268 in such a manner that it is normally centrally located between the nozzles, in which case fluid streams issuing from nozzles 267 and 268 will be equally impeded. As flapper 270 is physically displaced from its normal position, the impedance offered to one stream increases while the impedance offered to the other stream decreases thereby causing a pressure differential to exist between ports 255 and 256. Spool 251 is consequently displaced from its normal central position thus changing the amount of fluid discharged through bypass port 259 and accordingly changing the amount of fuel available to the engine through port 258 and conduit 239. A pair of bellows 280 and 281 are arranged to mechanically displace flapper 270 in one direction or the other as the pressure in bellows 280 is more or less than that in bellows 281. Bellows 280 and 281 are connected to outlet passages 210 and 211 respectively of amplifier 207 and are thereby actuated by the output signals therefrom.

The operation of this system will now be apparent. Selector 100 is set for a desired engine speed, thereby positioning piston 87 of fluid potentiometer 81 within chamber 85 such that a fluid pressure differential output indicative of the desired speed is provided between ports 95 and 96. A fluid signal indicative of the actual engine speed is supplied by fluid amplifier 67 as hereinbefore discussed. The fluid signal representing the selected engine speed is summed with the fluid signal representing the actual engine speed in amplifier 76 which provides a resultant speed error output signal. The speed error signal is then summed with the fluid output signal of stall prevention circuit 102 in amplifier 177. In normal operation engine 50 will be in no danger of compressor stall and the fluid output signal of stall prevention circuit 102 will be of a sense and magnitude such that the effect of the speed error signal is not counteracted. Thus, in the absence of impending compressor stall, the output of amplifier 177 is substantially unmodified speed error signal. The output signal of amplifier 177 is summed with the fluid output signal of temperature limiting circuit 103 in amplifier 207. In normal operation, the temperature of engine 50 will be in no danger of exceeding its maximum allowable limit and the output of temperature limiting circuit 103 will be of a sense and magnitude such that the effect of the signal from amplifier 177 is not counteracted. Thus, in the absence of an overtemperature condition, the output of amplifier 207 will be the substantially unmodified output of amplifier 177. Further, in the absence of impending compressor stall and engine overtemperature, the output of amplifier 207 will be the substantially unmodified speed error signal. The fuel flow to engine 50 will thereby be controlled by fuel metering valve 240 substantially solely in response to the error signal caused by a difference between the selected engine speed and the actual engine speed. Therefore, if the selected speed is greater than the actual engine speed, the pressure in conduit 211 will be greater than the pressure in conduit 210. Consequently, bellows 281 will expand and bellows 280 will contract causing flapper 270 to pivot counterclockwise thus tending to close nozzle 268 and increase the pressure in conduit 266 relative to the pressure in conduit 265. Spool valve 251 will be caused to move to the left thus closing bypass port 258 and conduit 239. Conversely, if the selected speed is less than the actual engine speed, the pressure differential in conduits 265 and 266 will be such that spool valve 251 will move to the right thereby opening bypass port 259 and decreasing the fuel flow to engine 50.

However, in the event of a large speed error signal, such as may be caused by changing the setting of selector 100 by a substantial amount, engine 50 may be called upon to accelerate at a rate which will cause compressor stall and/or engine overtemperature. As hereinbefore discussed, function generator 128 continuously generates an allowable compensated temperature limit for the existing engine speed and compressor inlet temperature. If the actual compensated engine temperature exceeds this limit, amplifier 163 supplies an error signal to amplifier 177 which counteracts the speed error signal from amplifier 76. The speed control signal is thus reduced by the stall prevention signal so as to reduce the fuel flow to engine 50 and prevent compressor stall.

Under certain operating conditions, the maximum allowable engine temperature may be reached before the engine is in danger of compressor stall. In this case, as hereinbefore discussed, temperature limiting circuit 103 will supply a signal to amplifier 207 such that the signal from amplifier 177 is counteracted. The output of the amplifier 207 will thus cause fuel metering valve 240 to limit the flow of fuel to engine 50 so as to prevent engine overtemperature. At all times, the control system prevents engine 50 from exceeding its maximum allowable speed. Amplifier 67 provides the speed signal to control means 173 which in turn controls the flow of fuel to engine 50 to prevent excessive speed.

I claim:
1. In combination:
  a gas turbine engine including a compressor and a turbine for extracting energy from a fluid within said engine;
  speed sensing means in communication with said compressor and with fluid entering said compressor, said speed sensing means operable to produce a first fluid signal indicative of the speed and the inlet temperature of said compressor;
  temperature sensing means in communication with fluid at the inlet to said turbine and with fluid entering said compressor, said temperature sensing means operable to produce a second fluid signal indicative of the inlet temperature of said turbine and the inlet temperature of said compressor;
  stall controller means connected to said speed sensing means and said temperature sensing means so as to receive said first and second fluid signals therefrom, said stall controller means being operable to provide a third fluid signal in response to said first and said second fluid signals; and
  control means connected to said stall controller means so as to receive said third fluid signal therefrom, said control means being effective to vary an independent operating variable of said engine in response to said third fluid signal.

2. The combination of claim 1 further including: speed;
  speed selection means connected to said control means and operable to provide a fourth fluid signal thereto indicative of a selected engine speed
  said control means being effective to vary an independent operating variable of said engine in response to said third and fourth fluid signals.

3. The combination of claim 1 wherein:
  speed selection means is provided, said speed selection means being operable to provide a fourth fluid signal indicative of a selected engine speed;
  said speed sensing means includes means for producing a fifth fluid signal indicative of the actual speed of said compressor;
  said temperature sensing means includes means for producing a sixth fluid signal indicative of the actual temperature of the fluid at the inlet to said turbine; and
  said speed selection means, said speed sensing means and said temperature sensing means are connected to said control means so as to supply said fourth, fifth and sixth fluid signals thereto, said control means being effective to vary the flow of fuel to said engine in response to said third, fourth, fifth and sixth fluid signals.

4. A stall prevention system for a turbojet engine including rotary means for extracting energy from a fluid within the engine comprising:
  speed sensing means in communication with said rotary means and with fluid entering said engine, said speed sensing means operable to produce a first fluid signal indicative of the speed of said rotary means and the temperature of fluid entering said engine;
  temperature sensing means associated with said engine and in communication with fluid entering said engine, said temperature sensing means operable to produce a second fluid signal indicative of the temperature of fluid within said engine and the temperature of fluid entering said engine;
  stall controller means connected to said speed sensing means and said temperature sensing means so as to receive said first and second fluid signals therefrom, said stall controller means operable to provide a third fluid signal indicative of stall of said rotary means in response to said first and second fluid signals; and
  control means connected to said stall controller means so as to receive said third fluid signal therefrom, said control means being effective to vary the flow of fuel to said engine in response to said third fluid signal such that engine stall is prevented.

5. Control apparatus for controlling the operation of a turbojet engine including turbine drive means comprising:
  a temperature sensing circuit including means responsive to the temperature of a fluid within said engine immediately upstream of said turbine drive means, said temperature sensing circuit being operable to provide a first fluid signal indicative of the temperature of said turbine drive means;
  a speed sensing circuit including means responsive to the speed of said turbine drive means, said speed sensing circuit being operable to provide a second fluid signal indicative of the actual speed of said turbine drive means;
  stall controller means connected to said speed sensing circuit so as to receive the first fluid signal therefrom, said stall controller means being operable to produce a third fluid signal indicative of a permissible reference temperature for said engine, said permissible reference temperature being indicative of incipient engine stall;
  a speed selection circuit operable to provide a fourth fluid signal indicative of the selected speed of said turbine drive means; and
  control means connected to said temperature sensing circuit, said speed sensing circuit, said stall controller means and said speed selection circuit so as to receive said first, second, third and fourth fluid signals therefrom, said control means being effective to vary the flow of fuel to said engine in response to said first, second, third and fourth fluid signals.

6. The control apparatus of claim 5 wherein said control means is effective to vary the flow of fuel of said engine as a function of the difference between a selected engine speed and the actual engine speed.

7. The control apparatus of claim 6 wherein said control means is further effective to vary the flow of fuel to said engine as a function of the difference between the permissible reference temperature and the temperature of said turbine drive means.

8. The control apparatus of claim 7 wherein said control means is proportionally responsive to the difference between the selected engine speed and the actual engine speed and the difference between the permissible reference temperature and the temperature of said turbine drive means.